US007849106B1

(12) United States Patent
Agrawal et al.

(10) Patent No.: US 7,849,106 B1
(45) Date of Patent: Dec. 7, 2010

(54) EFFICIENT MECHANISM TO SUPPORT USER DEFINED RESOURCE METADATA IN A DATABASE REPOSITORY

(75) Inventors: Abhyudaya Agrawal, San Francisco, CA (US); Ravi Murthy, Fremont, CA (US); Nipun Agarwal, Santa Clara, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 11/003,611

(22) Filed: Dec. 3, 2004

(51) Int. Cl.
*G06F 7/00* (2006.01)
*G06F 17/30* (2006.01)
(52) U.S. Cl. .................... 707/803; 707/809
(58) Field of Classification Search ............ 707/3, 707/10, 102
See application file for complete search history.

(56) References Cited

U.S. PATENT DOCUMENTS

| | | | |
|---|---|---|---|
| 5,680,614 | A | 10/1997 | Bakuya et al. |
| 5,964,407 | A | 10/1999 | Sandkleiva |
| 5,974,407 | A | 10/1999 | Sacks |
| 6,016,497 | A * | 1/2000 | Suver ..................... 707/103 R |
| 6,236,988 | B1 | 5/2001 | Aldred |
| 6,279,007 | B1 | 8/2001 | Uppala |
| 6,370,537 | B1 | 4/2002 | Gilbert et al. |
| 6,393,456 | B1 | 5/2002 | Ambler et al. |
| 6,457,007 | B1 | 9/2002 | Kikuchi et al. |
| 6,487,469 | B1 | 11/2002 | Formenti |
| 6,493,742 | B1 | 12/2002 | Holland et al. |
| 6,532,488 | B1 | 3/2003 | Ciarlante et al. |
| 6,587,873 | B1 | 7/2003 | Nobakht et al. |
| 6,643,633 | B2 | 11/2003 | Chau et al. |

(Continued)

FOREIGN PATENT DOCUMENTS

WO          WO 00/49533          8/2000

(Continued)

OTHER PUBLICATIONS

Bourret, R. et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

*Primary Examiner*—Cam Y T Truong
(74) *Attorney, Agent, or Firm*—Hickman Palermo Truong & Becker LLP (57) ABSTRACT

A method and apparatus for facilitating the management of metadata is disclosed, specifically by associating metadata with an XML schema. The database system provides a method that allows end users to maintain additional information describing resources. User-defined metadata attributes are associated as an XML schema which in turn is mapped to a table, referred to as the user metadata table. The XML schema contains user-defined information specifying the metadata that the end-user wants the system to store and maintain. Additionally, a reference is created between an entry in the user metadata table and its corresponding resource entry in the resource table. The resources are accessed directly or by issuing queries against the user metadata table. The querying of the user metadata table gains the benefit of fast and efficient query results and access time.

14 Claims, 4 Drawing Sheets

U.S. PATENT DOCUMENTS

| | | | |
|---|---|---|---|
| 6,725,212 | B2 | 4/2004 | Couch et al. |
| 6,959,416 | B2 | 10/2005 | Manning et al. |
| 7,043,472 | B2 | 5/2006 | Aridor et al. |
| 7,117,216 | B2 | 10/2006 | Chakraborty |
| 7,139,746 | B2 | 11/2006 | Shin et al. |
| 2002/0073056 | A1 | 6/2002 | Broster et al. |
| 2002/0078068 | A1 | 6/2002 | Krishnaprasad et al. |
| 2002/0087510 | A1 | 7/2002 | Weinberg et al. |
| 2002/0099687 | A1* | 7/2002 | Krishnaprasad et al. ........ 707/1 |
| 2003/0014397 | A1* | 1/2003 | Chau et al. .................... 707/3 |
| 2003/0033285 | A1 | 2/2003 | Jalali et al. |
| 2003/0065659 | A1 | 4/2003 | Agarwal et al. |
| 2003/0101194 | A1 | 5/2003 | Rys et al. |
| 2003/0140308 | A1* | 7/2003 | Murthy et al. .............. 715/500 |
| 2003/0154204 | A1 | 8/2003 | Chen-Wright et al. |
| 2003/0208498 | A1* | 11/2003 | Feinberg et al. ............ 707/100 |
| 2004/0088320 | A1 | 5/2004 | Perry |
| 2005/0091183 | A1* | 4/2005 | Cunningham et al. .......... 707/1 |
| 2005/0228818 | A1 | 10/2005 | Murthy et al. |
| 2006/0047646 | A1* | 3/2006 | Maluf et al. .................. 707/4 |

FOREIGN PATENT DOCUMENTS

| | | |
|---|---|---|
| WO | WO 01/59602 A1 | 8/2001 |
| WO | WO 01/61566 A1 | 8/2001 |

OTHER PUBLICATIONS

Chae, Mi-Ok et al., "Design and Implementation of an Object-Oriented Multimedia DBMS Tightly Coupled with Information Retrieval Functions," Proc. 17$^{th}$ IASTED International Conference on Applied Informatics, Feb. 15-18, 1999, abstract.

Cheng, Josephine et al., "IBM DB2 XML Extender," IEEE, ICDE '00 Conference, San Diego, Feb. 2000, 139 pages.

Jajodia, Sushil et al., "Toward a Multilevel Secure Relational Data Model," ACM, 1991, 8393 SIGMOD Record, Jun. 20, 1991, No. 2, New York, US, XP 000364619, pp. 50-59.

Noser, Hansrudi et al., Dynamic 3D Visualization of Database-Defined Tree Structures on the WWW by Using Rewriting Systems, 2000, IEEE, XP-002262516, pp. 247-254.

Vorthmann, S. et al. "Beyond Schemas, Schema Adjuncts and the Outside World,"Markup Languages, Online!, vol. 2, No. 3, Jun. 2000, pp. 1-8.

MacKenzie, David et al., "Finding Files", GNU Findutils Version 4.1.2, Nov. 1994, 38 pages.

Japanese Patent Office, "Notice of Grounds of Rejection", Patent application No. 533163/2003, mailed Aug. 19, 2008 / received Aug. 21, 2008, 7 pages.

Claims, Patent application No. 533163/2003, 9 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

\* cited by examiner

EFFICIENT MECHANISM TO SUPPORT USER DEFINED RESOURCE METADATA IN A DATABASE REPOSITORY

CROSS REFERENCE TO RELATED APPLICATIONS

This application is related to the following: U.S. patent application Ser. No. 10/259,278, entitled "Mechanism for Mapping XML Schemas to Object-Relational Database Systems," by Ravi Murthy et, al., filed on Sep. 27, 2002; and U.S. patent application Ser. No. 10/260,384, entitled "Providing A Consistent Hierarchical Abstraction Of Relational Data" Nipun Agarwal et al., filed on Sep. 27, 2002. The contents of the preceding applications in this paragraph are incorporated herein by reference in their entirety for all purposes, as if fully set forth herein.

FIELD OF THE INVENTION

The present invention relates to storage and querying of user-defined metadata by the database management system, specifically, by using an XML schema to define and maintain the metadata.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section The amount and kinds of data available electronically has increased dramatically in recent years. The data resides in different forms, ranging from unstructured data in file systems to highly structured in relational database systems. Often, unstructured data is in the form of digitized sounds or visual images. Semi-structured data is (from a particular viewpoint) neither unstructured data nor strictly structured. Some of the data has structure even if the structure is often implicit, and not as rigid or regular as that found in standard database systems. For example, data that is not a table-oriented format as in a relational model or a sorted-graph format as in object relational database.

The benefit of storing data in a database is that the database provides support for storing large amounts of information and for accessing data in a very flexible and efficient manner. In contrast to the structured content of the relational database, the majority of unstructured or semi-structured content is stored in a file system. Unfortunately, the file system does not support complex data retrieval. For example, the contents of every directory may have to be inspected to retrieve all the documents created on a particular day.

In a relational database system, the relational database system stores information in tables comprised of rows and columns. Each row is identified by a unique RowID. Each column represents an attribute of a record, and each row represents a particular record. Data is retrieved from the database by submitting queries to a database management system. Structured Query Language (SQL) is an example of a database language supported by many existing database management systems. A database system can also receive data definition language statements that define tables, columns and other database structures. In response to receiving such statements, the database creates or modified the database structures and generates data defining the structures.

In spite of unstructured or semi-structured content being stored on a file system, there is a need to efficiently store and manage the content's metadata for efficient access and querying. Metadata describe and define resources that hold unstructured or semi-structured content. For example, file size, creation time or author are all examples of metadata.

An approach for managing such metadata is the system-defined approach. In this approach, a database management system provides, in a repository, a well-defined set of system-defined metadata, also known as system properties, which the database management system is able to maintain as part of the infrastructure. For example, when inserting a row into the database the application determines the creation time and inserts this value into the database. Some of the system-defined metadata is easily accessible and provides efficient queries.

A problem with this approach is that a repository might be used by several different applications that might require their own custom metadata, herein referred to as user-defined meta-data. For example, a user may wish to store additional information in the repository for an image such as the images' resolution or height and width.

This problem was being handled by storing user-defined metadata in some form of packed or chunked storage such as a CLOB. CLOB are datatypes which store large blocks of character data in the database, in-line or out-of-line. Both fixed-width and variable-width character sets are supported. Every CLOB variable stores a locator, which points to a large block of character data. The size of a CLOB cannot exceed four gigabytes. CLOBs are unstructured and do not provide efficient query and storage benefits. Furthermore, the only way to access particular information from the CLOB is to parse the entire package and search for the particular piece of data. This makes the queries slow. Additionally, any updates to this data would also be slow, as the entire package would have to be updated.

One approach that addresses short comings of using CLOBs is to create a functional index on top of the CLOB. With this approach you get some enhanced query ability but the approach can only be used in limited circumstances. For example, functional indexes cannot be created on columns that contain a collection, such as a v-array, and thus this approach will not work for columns that contain v-arrays.

Based on the forgoing, it is clearly desirable to provide a mechanism that provides efficient storage and querying of user-defined metadata and efficiently query it.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

A method and system for managing user-defined metadata by associating it with an XML schema is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

I. Functional Overview

Techniques are provided for facilitating the management of metadata, specifically by associating metadata with an XML schema. Metadata as the term is used herein, is data which describes and defines resources which hold unstructured or semi-structured data. The resource may be a program that performs an action, or a file of information and content to be displayed. Examples of metadata are file size, creation time, author, or height and width of images.

According to one embodiment, the database system has pre-defined system metadata which are generated, stored and maintained by the database system. Each resource is stored in a table referred to as the resource table. The pre-defined system properties/metadata are herein referred to as system-defined metadata. The system-defined metadata is provided as part of the database infrastructure and cannot be modified or added to by an end-user.

Also, the database system provides a method that allows end users to maintain additional information describing resources. According to one embodiment user-defined metadata attributes are associated as an XML schema which in turn is mapped to a table, herein referred to as the user metadata table. The XML schema contains user-defined information specifying the metadata that the end-user wants the system to store and maintain. The metadata specified by the end user is herein referred to as user-defined metadata. Techniques for mapping an XML schema to tables and creating such tables are described in U.S. patent application Ser. No. 10/259,278, entitled "Mechanism for Mapping XML Schemas to Object-Relational Database Systems".

According to one embodiment a reference is created between an entry in the user metadata table and its corresponding resource entry in the resource table. The resources are accessed directly or by issuing queries against the user metadata table. The querying of the user metadata table gains the benefit of fast and efficient query results and access time.

A database system stores data in one or more data containers, each container contains records, and the data within each record is organized into one or more fields. In a database system that stores data in a relational database, the data containers are referred to as tables, the records are referred to as rows, and the attributes are referred to as columns. In object oriented databases, the data containers are referred to as object classes, the records are referred to as objects, and the attributes are referred to as object attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Resource Table

Figure 1:
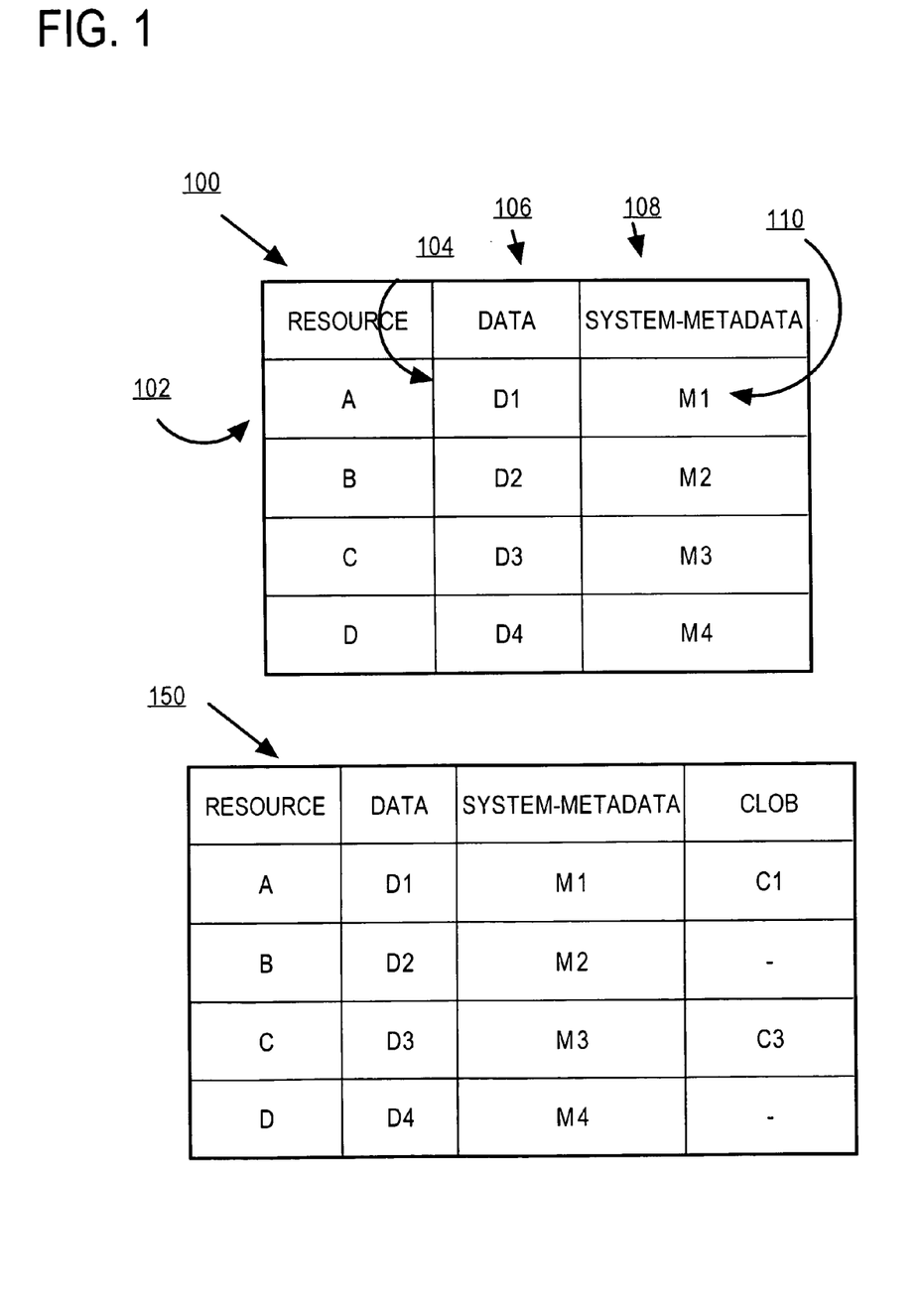
FIG. 1 is a block diagram that shows resource tables according to embodiments of the invention.

FIG. 1 is a block diagram of resource table 100 used in a database system. Resource table 100 includes one row for each resource contained in the database. The row for a given resource includes the name associated with the given resource, the data associated with the given resource, the system defined metadata of a given resource and a black box column for additional storage.

For example, row 102 contains the resource "A" and value D1 associated with resource "A". In the example of resource table 100, the data structured used to store the content of the resource is column 106. The data type for such a column could be, for example, a LOB (Large Object) type, such as a Binary LOB (BLOB), a Character LOB (CLOB). An alternative embodiment stores the content of columns 106 as a relational schema. Column 108 contains a system-defined value.

User-Defined Metadata Table

Figure 2:
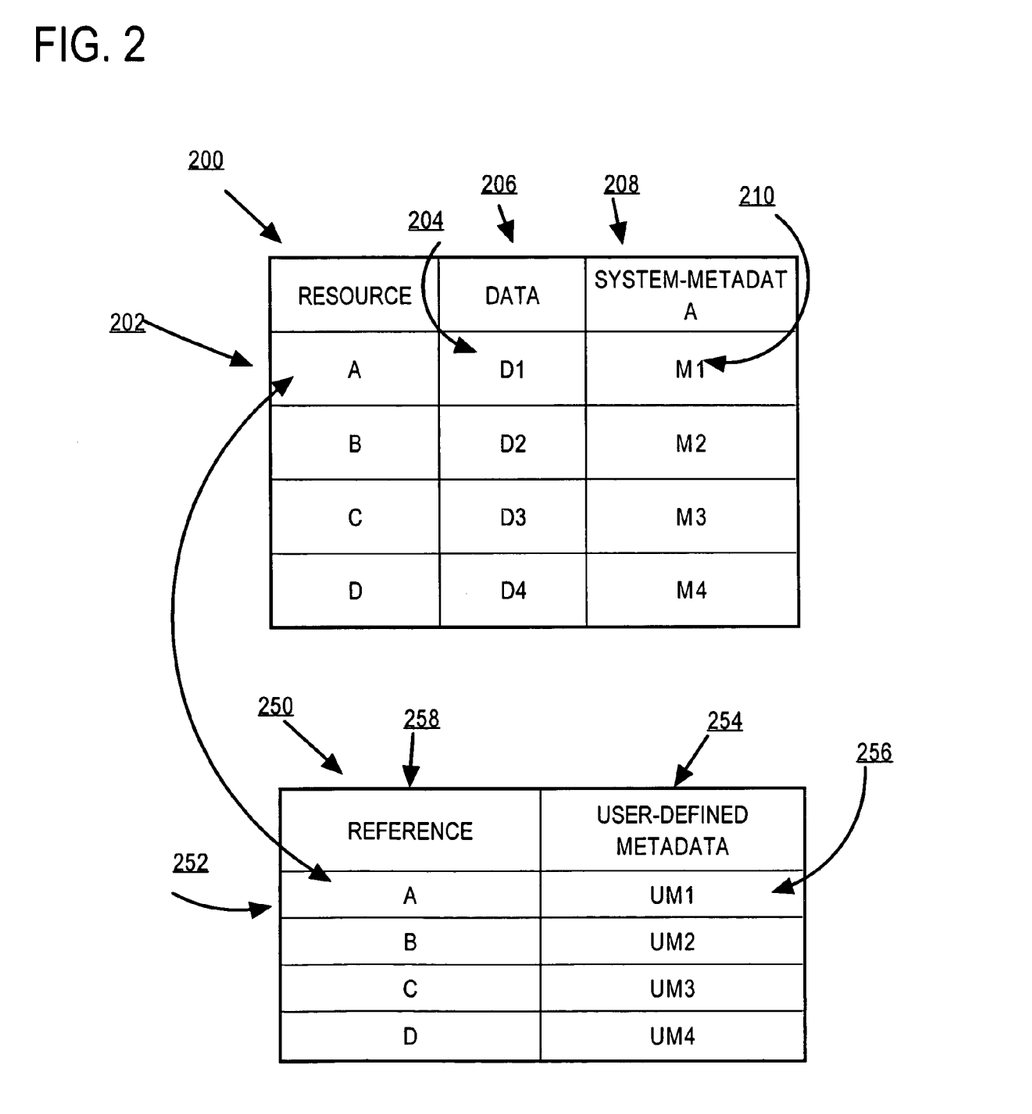
FIG. 2 is a block diagram that shows a resource table and a user-defined metadata table associated to an entry in the resource table, according to an embodiment.

FIG. 2. is a block diagram of two tables (resource table 200 and user metadata table 250). For each row of user metadata table 250, the USER-DEFINED METADATA column 254 stores metadata associated with a resource of a row of table 200 and a reference to the row. For example, row 252 stores metadata value UM1 in the USER-DEFINED METADATA column 256. The REFERENCE column 258 stores a reference to the row of the resource associated with the user-defined metadata. Thus, REFERENCE column 258 indicates that metadata entry UM1 256 is associated with resource "A" 202 of resource table 200.

As used herein, the term "reference" generally refers to any data used to identify a storage location of other data. For example, the reference column 152 can store pointers, or more complex information such as the "ref" data type supported by Oracle database systems such as a row-id. The present invention is not limited to any particular type of data for locating the resource associated with user-defined metadata.

Figure 3:
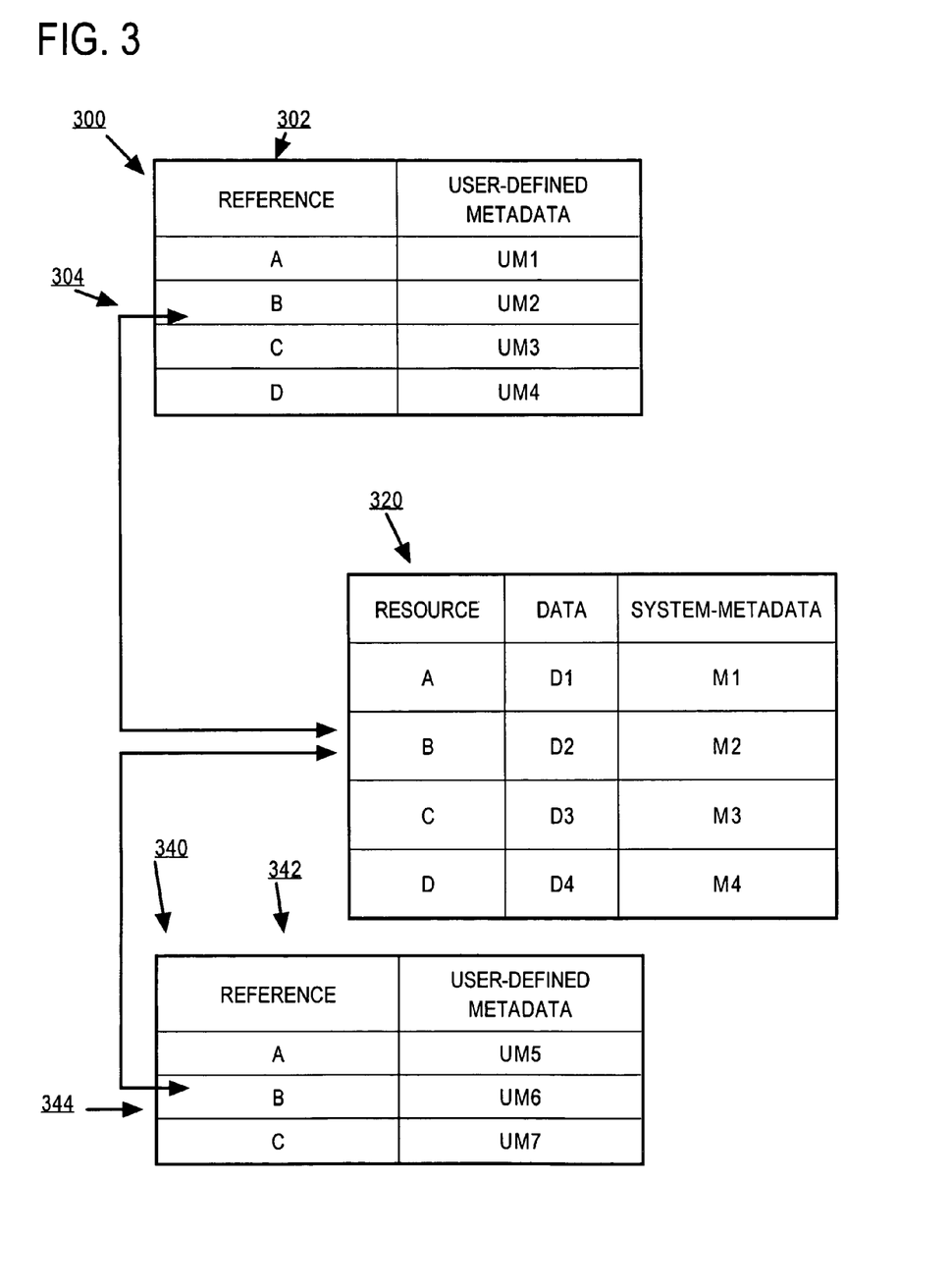
FIG. 3 is a block diagram illustrating multiple user meta-data tables which are associated with the same resource of a resource table, according to an embodiment.

In one embodiment there are multiple user-metadata tables which have references to the same resource in the resource table. Each entry in the resource table can have multiple references, such as a pointer, to multiple user metadata tables. For example FIG. 3 depicts two user metadata tables (user metadata 300 and user metadata table 340). Rows 304 and 344 each have references, in the REFERENCE columns 302 and 342 respectively, to resource "B" of resource table 300.

Creating XML Schema-Based Table

According to one embodiment, user-defined properties/metadata are stored as schema based XML documents. XML is a markup specification language which is used to design ways of describing information (text or data), for storage, transmission, or processing by a program. The elements defined by the XML schema are used by the database system to create internal user metadata tables. An element defined in the XML schema depicts user-defined metadata and may be mapped to a column within a user metadata table. Further description and reference to XML schemas is found in: XML Schema Part 0: Primer, W3C Recommendation, May 2, 2001, XLM Schema Part 1: Structures, W3C Recommendation May 2, 2001, XML Schema Part 2: Datatypes, W3C Recommendation May 2, 2001, each published by the W3C (World Wide Web Consortium) and each hereby incorporated by reference.

When a user or application inserts a row, associated with a resource into the database, which conforms to the XML schema, the database system will insert one row into the user metadata table. During the inserting of the row a validation check is performed and an error is raised if the metadata does not conform to the XML schema.

In another embodiment there are multiple user metadata tables, which correspond to multiple XML schemas. Multiple XML schemas can define metadata for the same resource. For example, FIG. 3 provides an example of multiple end-users who each have access to resources A, B and C. Each end-user created their own XML metadata schema and as a result the database system produced two user metadata tables namely, user metadata table 300 and user metadata table 340. In this embodiment there is no limit on how many XML schemas can be created for shared content. The benefit of multiple XML schemas is that we do not have to duplicate shared content.

XML Schema Constraints and Validation

According to one embodiment an XML Schema consisting of type definitions and element declarations is used to provide constraints on the kind of values which are stored as part of the user metadata table. For example, an XML document which defines attribute "a" characterizes that attribute "a" can have a range of values: "v1, v2 or v3".

Also, an XML Schema that defines a set of user-defined metadata attributes provides a mechanism for validation. The validation is done while the user-defined metadata is being stored. Specifically, each user-defined metadata entry must conform to the structured specified in the XML schema. During the validation phase the metadata is inspected to verify that it conforms to the structure specified in the XML schema. For example, if user-defined metadata "a" has a value "v1" the XML schema must define an attribute of type "a" as being able to have a value "v1".

Extending an XML Schema

According to one embodiment the XML schema provides the use of inheritance for extending an XML schema. An XML schema can inherit the definitions and attributes of another XML schema and allows the end-user to extend the metadata which is already defined in an XML schema.

For example, an XML schema, which provides a schema for metadata height and width of image documents can be extended to an XML schema which includes not only width and height but defines the attributes for the resolution of the image documents.

Querying the User-Defined Metadata Table

In one embodiment of the invention a query based on the properties defined by the XML schema is performed by querying directly against the columns of the user metadata table. For example, if the end user wants to query based on the height property, which is contained in the user metadata table, an index is created on the height property and directly queried against the index.

Additionally, an end-user can query user-defined metadata in conjunction with system-defined metadata. For example a single query can contain the height property, which is a user-defined property, as well as creation time, which is a system-defined property.

Hardware Overview

Figure 4:
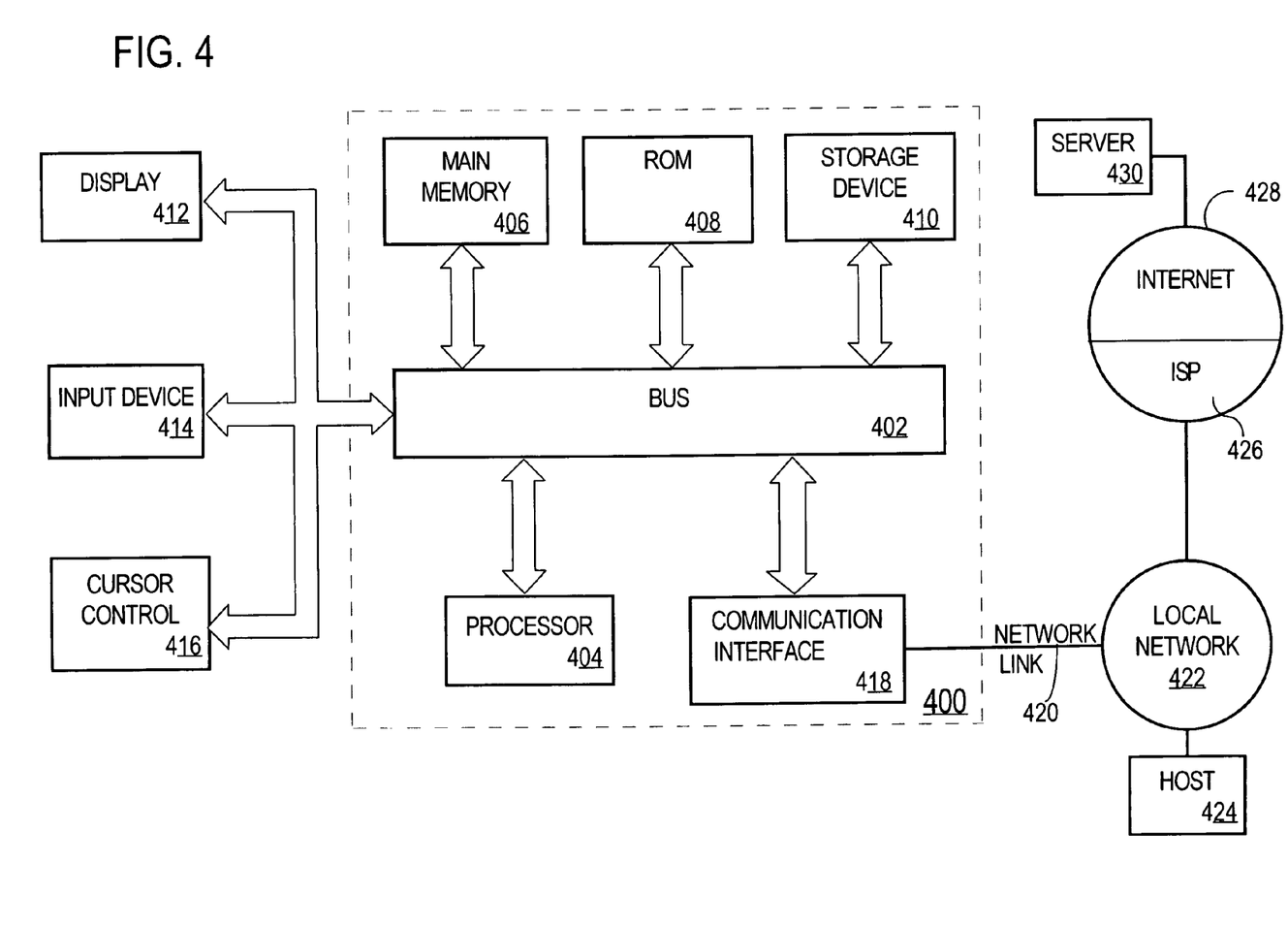
FIG. 4 is a block diagram of a system on which embodiments of the invention may be implemented.

FIG. 4 is a block diagram that depicts a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable storage media include, for example, a floppy disk, a flexible disk, hard disk, magnetic tape, or any other magnetic storage medium, a CD-ROM, any other optical storage medium, RAM, a PROM, and EPROM, a FLASH-EPROM, any other memory chip or cartridge, or any other storage medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

What is claimed is:

1. A computer implemented method of managing metadata by a database system, the method comprising:

the database system receiving data defining a user-specified Extensible Markup Language (XML) schema;

the database system storing metadata describing resources that hold either unstructured or semi-structured data, wherein the metadata is stored in a plurality of columns of one or more tables managed by said database system; and for each resource of said resources, storing user-specified metadata values that specifically describe said each resource, wherein the user-specified metadata values stored for said each resource are separate and distinct from the user-specified metadata values stored for any other resource of said resources, wherein the step of storing comprises:

(a) storing, in a first column of said plurality of columns in a respective row of said first column, system-defined metadata values specifically describing said each resource, wherein the respective row of said first column is separate from other respective rows of said first column storing the system-defined metadata values for other resources of said resources; and (b) storing, in a second column of said plurality of columns in a respective row of said second column, the user-specified metadata values that conform to said user-specified XML schema and that specifically describe said each resource, wherein the respective row of said second column is separate from other respective rows of said second column storing the user-specified metadata values specifically describing other resources of said resources;

validating, within said database system, said user-specified metadata values to determine whether said user-specified metadata values conform to said user-specified XML schema;

wherein said database system uses said user-specified XML schema to create said second column;

wherein the method steps are performed by one or more computing devices.

2. The method as recited in claim 1, wherein said user-specified XML schema is used by the database system to create a certain table; and wherein said certain table stores at least a portion of said user-specified metadata values.

3. The method as recited in claim 1, further comprising the step of inserting a first row into a table that includes said second column; and wherein said first row contains user-specified metadata values which conform to said user-specified XML schema.

4. The method as recited in claim 3, wherein said inserting of said first row further comprises the step of storing a reference in said first row referring to the row that contains the resource that is specifically described by the user-specified metadata values stored in said first row.

5. The method as recited in claim 1, wherein said user-specified XML schema defines constraints for said user-specified metadata values.

6. The method as recited in claim 1, further comprising the step of querying the user-specified metadata values stored in said second column.

7. The method as recited in claim 1, wherein a second XML schema extends said user-specified XML schema such that said second XML schema inherits the definitions and attributes of said user-specified XML schema.

8. A machine-readable storage medium carrying one or more sequences of instructions for managing a database system, wherein execution of the one or more sequences of instructions by one or more processors causes the one or more processors to perform the steps of:

the database system receiving data defining a user-specified Extensible Markup Language (XML) schema;

the database system storing metadata describing resources that hold either unstructured or semi-structured data, wherein the metadata is stored in a plurality of columns of one or more tables managed by said database system; and for each resource of said resources, storing user-specified metadata values that specifically describe said each resource, wherein the user-specified metadata values stored for said each resource are separate and distinct from the user-specified metadata values stored for any other resource of said resources, wherein the step of storing comprises:
- (a) storing, in a first column of said plurality of columns in a respective row of said first column, system-defined metadata values specifically describing said each resource, wherein the respective row of said first column is separate from other respective rows of said first column storing the system-defined metadata values for other resources of said resources; and
- (b) storing, in a second column of said plurality of columns in a respective row of said second column, user-specified metadata values that conform to said user-specified XML schema and that specifically describe said each resource, wherein the respective row of said second column is separate from other respective rows of said second column storing the user-specified metadata values specifically describing other resources of said resources, validating, within said database system, said user-specified metadata values to determine whether said user-specified metadata values conform to said user-specified XML schema;

wherein said database system uses said user-specified XML schema to create said second column.

9. The machine-readable storage medium as recited in claim 8, wherein said user-specified XML schema is used by the database system to create a certain table; and wherein said certain table stores at least a portion of said user-defined metadata.

10. The machine-readable storage medium as recited in claim 8, further comprising the step of inserting a first row into a table that includes said second column; and wherein said first row contains user-defined metadata which conforms to said user-specified XML schema.

11. The machine-readable storage medium as recited in claim 10, wherein said inserting of said first row further comprises the step of storing a reference in said first row referring to a row that contains the resource that is specifically described by user-defined meta-data stored in said first row.

12. The machine-readable storage medium as recited in claim 8, wherein said user-specified XML schema defines constraints for said particular user-defined metadata.

13. The machine-readable storage medium as recited in claim 8, further comprising the step of querying said user-specified metadata values stored in said second column.

14. The machine-readable storage medium as recited in claim 8, wherein a second XML schema extends said user-specified XML schema such that said second XML schema inherits the definitions and attributes of said user-specified XML schema.

\* \* \* \* \*

UNITED STATES PATENT AND TRADEMARK OFFICE
CERTIFICATE OF CORRECTION

| | |
|---|---|
| PATENT NO. | : 7,849,106 B1 |
| APPLICATION NO. | : 11/003611 |
| DATED | : December 7, 2010 |
| INVENTOR(S) | : Abhyudaya Agrawal et al. |

It is certified that error appears in the above-identified patent and that said Letters Patent is hereby corrected as shown below:

In column 1, line 33, after "section" insert -- . --.

In column 4, line 63, delete "XLM" and insert -- XML --, therefor.

Signed and Sealed this
Ninth Day of August, 2011

David J. Kappos
*Director of the United States Patent and Trademark Office*